UNITED STATES PATENT OFFICE.

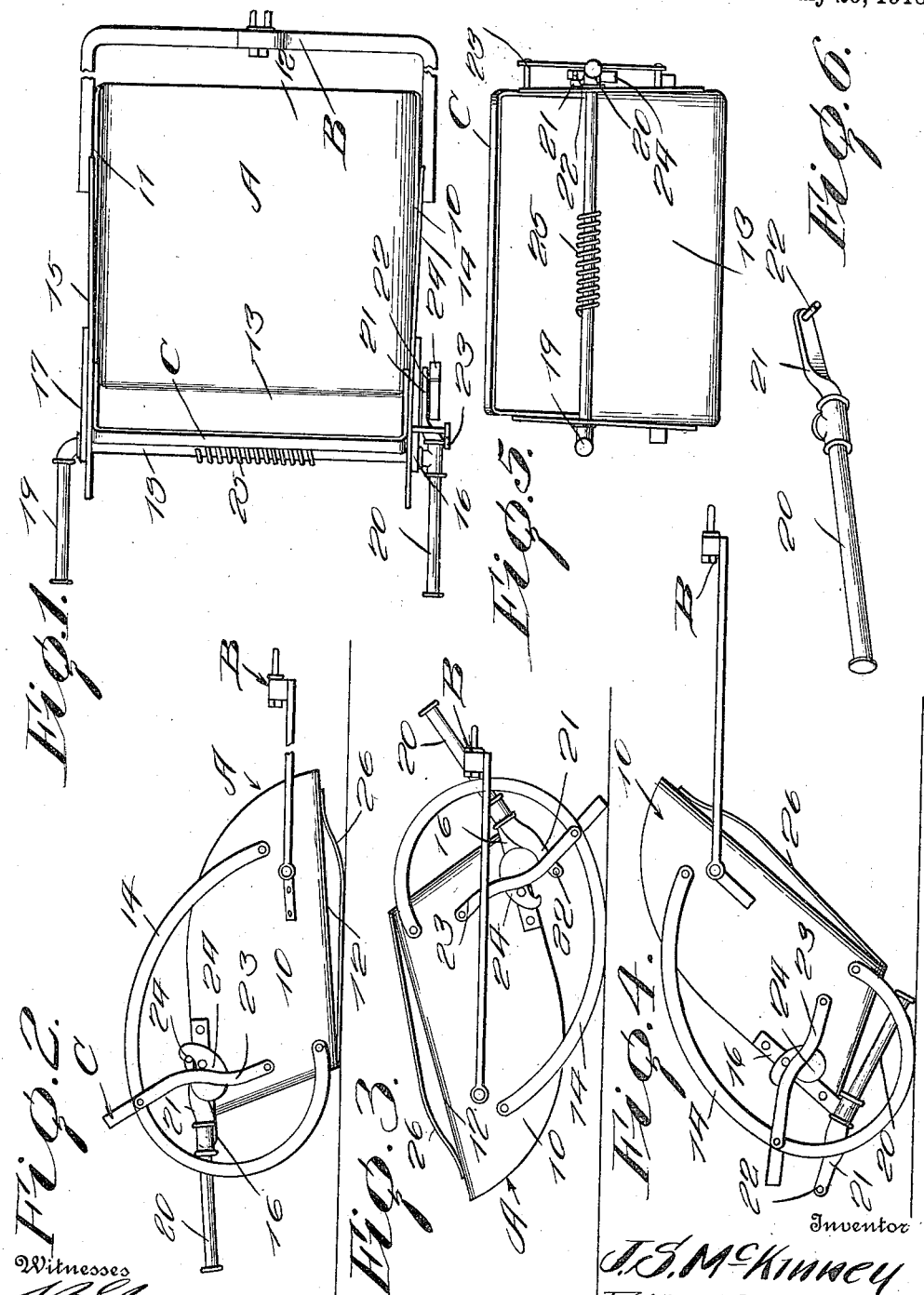

JOSEPH S. McKINNEY AND EDWARD H. McKINNEY, OF MENLO, KANSAS.

DRAG-SCRAPER.

1,068,687.

Specification of Letters Patent.

Patented July 29, 1913.

Application filed October 14, 1912. Serial No. 725,710.

*To all whom it may concern:*

Be it known that we, JOSEPH S. McKINNEY and EDWARD H. McKINNEY, citizens of the United States, residing at Menlo, in the county of Thomas, State of Kansas, have invented certain new and useful Improvements in Drag-Scrapers; and we do hereby declare the following to be a full, clear, and exact description of the invention, such as will enable others skilled in the art to which it appertains to make and use the same.

This invention relates to drag scrapers of the type commonly employed in the construction of roads and the excavation of ditches.

The object of the invention resides in the provision of a drag scraper wherein the scoop element is free to revolve to effect the dumping of the scraper.

A further object of the invention resides in the provision of a scraper of the type named in which the handles are pivotally connected to the scoop and adapted to be automatically locked against pivotal movement during the normal operation of the scraper and released during the revolving of the scoop upon dumping so as to permit said handles to pass through the draft yoke or bail of the scraper during the revolving of the scoop.

A still further object of the invention resides in the provision of a scraper, wherein the under side of the scoop is provided with a V-shaped runner having its apex disposed relatively near the forward end of the scoop and acting as a fulcrum to readily allow the operator to control the depth of cut.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a plan view of a scraper constructed in accordance with the invention. Fig. 2 a side elevation of same. Fig. 3 a view similar to Fig. 2 showing the position of the parts when the scoop member is in full dumping position. Fig. 4 a view similar to Fig. 2 showing the position of the parts when the scoop member has been almost completely revolved. Fig. 5 a rear view of what is shown in Fig. 1, and Fig. 6 a detail perspective view of the handle which coöperates directly with the gravity controlled latch.

Referring to the drawings, A indicates generally the scoop element of the scraper which includes side members 10 and 11, a bottom 12 and a back member 13. Pivotally connected to the side members 10 and 11 adjacent the forward ends of the latter are the arms of the usual U-shaped draft bail or yoke B. Secured to the inner faces of the side members 10 and 11 of the scoop adjacent the rear ends of said side members are the arms of a U-shaped fulcrum member C, the connection between said fulcrum member and the side members 10 and 11 of the scoop being of the rigid type and said fulcrum member extending upwardly from the scoop. Secured to the outer faces of the side members 10 and 11 and to the arms of the fulcrum member C are corresponding curved rockers 14 and 15 respectively for a purpose that will presently appear. Secured to the outer faces of the side members 10 and 11 and extending rearwardly of the scoop A are corresponding brackets 16 and 17 respectively and in these brackets is rotatably mounted a shaft 18.

Secured to the end of the shaft 18 adjacent the side member 11 is a handle 19, while another handle 20 is secured to the end of the shaft 18 adjacent the side member 10. The handle 20 is provided with an extension 21 which terminates at its free end in an outwardly directed finger 22.

Disposed in spaced relation to the outer face of the side member 10 and having its terminals secured to an arm of the fulcrum member C and to the side member 10 respectively is a plate 23 between which and the adjacent arm of the fulcrum member C the extension 21 of the handle 20 is adapted to be moved as the shaft 18 is rotated. Pivotally mounted between the plate 23 and the side member 10 for coöperation with the finger 22 of the handle 20 is a gravity controlled latch 24. This latch is so positioned and mounted that when the scoop A is in normal position as shown in Fig. 2 it will coöperate with the finger 22 and lock the handles 19 and 20 and the shaft 18 against rotation and permit the scraper to be controlled through the medium of said handles during the normal operation thereof.

Surrounding the shaft 18 is a spring 25 one end of which is anchored to the shaft 18 and the other end to the back member 13 of the scoop and said spring constantly tends to rotate the shaft 18 so as to move the finger 22 into engagement with the latch 24.

Secured to the under side of the bottom 12 of the scoop is a V-shaped runner 26 the apex of which is disposed relatively near the forward end of said bottom. This apex of the runner 26 serves as a fulcrum whereby the forward end of the scoop may be readily elevated through the medium of the handles 19 and 20 when the scraper is cutting at too great a depth. This runner 26 also enables the forward end of the scoop to be elevated when said scoop is loaded so that none of the contents will be spilled as the scraper is being drawn along the ground to the locality where it is desired to dump same. Again the runner 26 requires less draft while drawing the loaded scoop from place to place as it rides the scraper over soft ground whereas formerly the scraper would plow through such soft ground and require greatly increased draft to effect its movement.

What we claim is:—

1. In a scraper, a U-shaped draft bail, a scoop revolubly mounted between the arms of said bail, handles pivotally mounted on said scoop and normally locked against pivotal movement, and means for automatically releasing the handles during the revolving of the scoop whereby said handles are free to swing to a position permitting the passage through the bail.

2. In a scraper, a U-shaped draft bail, a scoop revolubly mounted between the arms of said bail, handles pivotally mounted on said scoop and normally locked against pivotal movement, means for automatically releasing the handles during the revolving of the scoop whereby said handles are free to swing to a position permitting their passage through the bail, and means for automatically locking the handles against pivotal movement when the scoop has made one complete revolution.

3. In a scraper, a U-shaped draft bail, a scoop revolubly mounted between the arms of said bail, handles having a common pivotal connection with said scoop, a latch mounted on the scoop normally coöperating with the handles to secure same against pivotal movement, and means for releasing said latch from locking relation to the handles during the revolving of the scoop whereby said handles are free to swing to a position permitting their passage through the bail.

4. In a scraper, a U-shaped bail, a scoop revolubly mounted between the arms of said bail, handles having a common pivotal connection with said scoop, a latch mounted on the scoop normally coöperating with the handles to secure same against pivotal movement, means for releasing said latch from locking relation to the handles during the revolving of the scoop whereby said handles are free to swing to a position permitting their passage through the bail, and means for automatically returning the handles to locking relation with respect to the latch when the scoop has made one complete revolution.

In testimony whereof, we affix our signatures, in presence of two witnesses.

JOSEPH S. McKINNEY.
EDWARD H. McKINNEY.

Witnesses:
  E. C. WHITE,
  H. V. CHRISTENSEN.

---

Copies of this patent may be obtained for five cents each, by addressing the "Commissioner of Patents, Washington, D. C."